(12) United States Patent
Rajani (10) Patent No.: US 12,511,265 B2
(45) Date of Patent: Dec. 30, 2025

(54) DEDUPLICATION FOR DATA TRANSFERS TO PORTABLE STORAGE DEVICES

(71) Applicant: Sandisk Technologies, Inc., Milpitas, CA (US)

(72) Inventor: Ankit Rajani, Raipur (IN)

(73) Assignee: Sandisk Technologies, Inc., Milpitas, CA (US)

( * ) Notice: Subject to any disclaimer, the term of this patent is extended or adjusted under 35 U.S.C. 154(b) by 506 days.

(21) Appl. No.: 17/845,630

(22) Filed: Jun. 21, 2022

(65) Prior Publication Data

US 2023/0409532 A1 Dec. 21, 2023

(51) Int. Cl.
*G06F 16/17* (2019.01)
*G06F 16/13* (2019.01)
*G06F 16/14* (2019.01)
*G06F 16/174* (2019.01)

(52) U.S. Cl.
CPC ........ *G06F 16/1752* (2019.01); *G06F 16/137* (2019.01); *G06F 16/152* (2019.01)

(58) Field of Classification Search
CPC ... G06F 16/1752; G06F 16/137; G06F 16/152
See application file for complete search history.

(56) References Cited

U.S. PATENT DOCUMENTS

| | | | | |
|---|---|---|---|---|
| 6,813,265 B1 * | 11/2004 | Henrion | ................. | G06F 13/36 370/381 |
| 8,250,325 B2 * | 8/2012 | Holdman | ............ | G06F 16/1752 711/E12.009 |
| 9,268,832 B1 * | 2/2016 | Challapalli | ............. | G06F 16/27 |
| 9,442,807 B1 * | 9/2016 | Zhang | .................. | G06F 16/1752 |
| 9,740,422 B1 * | 8/2017 | Ozdemir | ............. | G06F 11/1453 |
| 10,009,438 B2 * | 6/2018 | Das | ........................ | G06F 11/16 |
| 10,394,757 B2 * | 8/2019 | Cheung | ............... | G06F 16/1752 |
| 2007/0028047 A1 * | 2/2007 | Williamson | ........ | G06F 12/0864 711/216 |
| 2007/0198778 A1 * | 8/2007 | Chaudhry | ........... | G06F 12/0897 711/E12.043 |
| 2008/0005141 A1 * | 1/2008 | Zheng | ................. | G06F 16/1752 |

(Continued)

OTHER PUBLICATIONS

Mei Li,, Prefetch-aware fingerprint cache management for data deduplication systems, vol. 13, pp. 500-515 (Year: 2019).*

(Continued)

*Primary Examiner* — Pierre Vital
*Assistant Examiner* — Andrew N Ho
(74) *Attorney, Agent, or Firm* — Patterson + Sheridan, LLP (57) ABSTRACT

A data storage device for performing a deduplication process includes a data interface, a data buffer, a hash buffer, non-volatile storage media, and control circuitry. The control circuitry is configured to receive a plurality of data files from the host device, generate a first hash set for a first file, store the first hash set in the hash buffer, store the first file in the non-volatile storage media, and generate a second hash set for a second file. If the second hash set matches the first hash set, the control circuitry discards data of the second file in the data buffer and replaces the data of the second file with a pointer to the first file. If the second hash does not match any hashes in the hash buffer, the control circuitry stores the second file in the non-volatile storage media and the second hash in the hash buffer.

20 Claims, 7 Drawing Sheets

(56) References Cited

U.S. PATENT DOCUMENTS

| | | | | |
|---|---|---|---|---|
| 2011/0113012 A1* | 5/2011 | Gruhl | .................. | G06F 11/1451 |
| | | | | 707/646 |
| 2011/0246741 A1* | 10/2011 | Raymond | ............. | G06F 16/137 |
| | | | | 711/170 |
| 2011/0276781 A1* | 11/2011 | Sengupta | ............ | G06F 12/0897 |
| | | | | 711/216 |
| 2018/0113815 A1* | 4/2018 | Eckert | ................... | G06F 12/126 |
| 2021/0373775 A1* | 12/2021 | Theinert | ............... | G06F 3/0641 |

OTHER PUBLICATIONS

Mandagere, Demystifying Data Deduplication, 2008, Middleware' 08 Companion, p. 12-17 (Year: 2008).*

\* cited by examiner

DEDUPLICATION FOR DATA TRANSFERS TO PORTABLE STORAGE DEVICES

BACKGROUND

Field

This disclosure relates to data transfers to storage devices. More particularly, the disclosure relates to devices and methods for reducing duplicate data stored in the storage devices.

Description of Related Art

Data storage devices receive data from host devices and store them on a storage medium. As data storage devices have limited space, various techniques may be used to reduce the data stored on the device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Data storage devices have a limited amount of storage space. Some storage devices have hundreds of gigabytes of available storage, while some have terabytes of available storage. However, with the growing amount of data retained by users, even large storage devices can be filled up. Often, users may make duplicate copies of files inadvertently. They may copy a file instead of moving a file, creating two copies. They may copy files over to another storage device, and then, at a later time, copy back the files from the other storage device, creating more duplicates. In addition, these duplicate files may have different filenames, making finding these duplicates difficult. Therefore, it is useful to make more efficient use of the available storage space by removing duplicate files that are in the storage device.

Deduplication can provide several benefits, including improving storage efficiency and protecting flash devices from unnecessary/duplicate writes. As flash memory has a certain number of available write operations during its lifetime, reducing the number of writes can improve the longevity of flash memory. In addition, removing duplicates increases the effective storage capacity of a data storage device without adding any extra memory cells to the device. For example, when transferring a set of data files to the storage device from a host system, deduplication can cause a first total size of the data files as stored in the host system, and as first received by the data storage device, to be greater than a second total size of the data files as stored in the data storage device. By removing duplicate files, less storage space is used by the data storage device than the original size of the files as stored in the host system.

One possible way to find duplicate files involves running deduplication programs that scan data storage devices to find and remove duplicate data. However, while this works for independently powered computing systems such as servers, computers and laptops, this technique is difficult to use in portable storage devices that are only powered while connected to a host system. In some embodiments, these portable storage devices have no independent power (e.g., battery) and are usually disconnected from a host system and without power. Thus, a deduplication program could only run some of the time, while the storage device is externally powered by the host device. In addition, scanning the data storage devices with these deduplication program can add significant overhead to the systems running these programs.

One solution that can work for portable storage devices is removing duplicate files during file transfers, while the portable storage device is receiving power from the host system. As the removal occurs during a file transfer, the host system is necessarily connected and providing power. The portable data storage device can then implement a modified file transfer operation that searches for duplicate files and automatically removes these files during the transfer. In addition, by using hash functions or similar signature generation algorithms that are lightweight and computationally fast, the deduplication process can be run without significantly affecting the user experience.

Disclosed herein are systems, devices, and methods for removing duplicate files during file transfers. In some embodiments, a storage device is configured to generate file signatures for each file being transferred. These file signatures are then stored in the storage device. These file signatures are typically significantly smaller than the original file. They may be hundreds or thousands of times smaller than the file. For example, a 128 KB chunk of a file may be represented by a 20-byte hash, a 1/6400 ratio. As storing hash files can use up available space in the data storage device, keeping the hash files up to orders of magnitude smaller than the original file better enables the data storage device to realize space savings by removing duplicate files.

As a new file is transmitted to the storage device, a first file signature can be generated for the new file. The file signature can then be compared to the stored file signatures from other files already stored in the data storage device. If there is a match, that indicates that the new file is a duplicate of an existing file. The storage device can then discard the new file and replace it with a link to the existing file. For example, the new file may be replaced with a symbolic link with the same file name as the new file, such that the symbolic link appears to be the new file to a user.

In some embodiments, the file signature is generated using a hashing algorithm. Hash functions map data of an arbitrary size to data of a fixed size. The values returned by a hash function are called hash values, hash codes, digests, or simply hashes. The hashes created by hash functions can be stored in a data structure called a hash table, which enables quicker data lookups.

Hash functions are typically very fast to compute and try to minimize duplication of output values (collisions). However, when mapping a larger data set to a smaller size, there can be some collisions, where two different inputs map to the same output. That means that different data files may sometimes generate the same hash. That can result in a false positive, where one file is deemed to be a duplicate and discarded, even if that file is unique. One possible solution to this problem is dividing a file into chunks (e.g., 128 KB or other selected size). Each chunk is then run through the hash function. The hashes for the file are then collected into a hash set that represents that file. The hash set is then compared to hash sets from other files in order to determine if a file is a duplicate. While there is a probability that some data chunks of two different files may generate the same hash, the odds that all the data chunks of the two different files generate the same hash set without being duplicates are extremely low.

The following disclosure describes embodiments that use hash functions for finding duplicate files. However, the processes described herein can be used with other methods for generating data file signatures that can be compared with each other to find matches in the corresponding data files.

Data Storage Device

Figure 1:
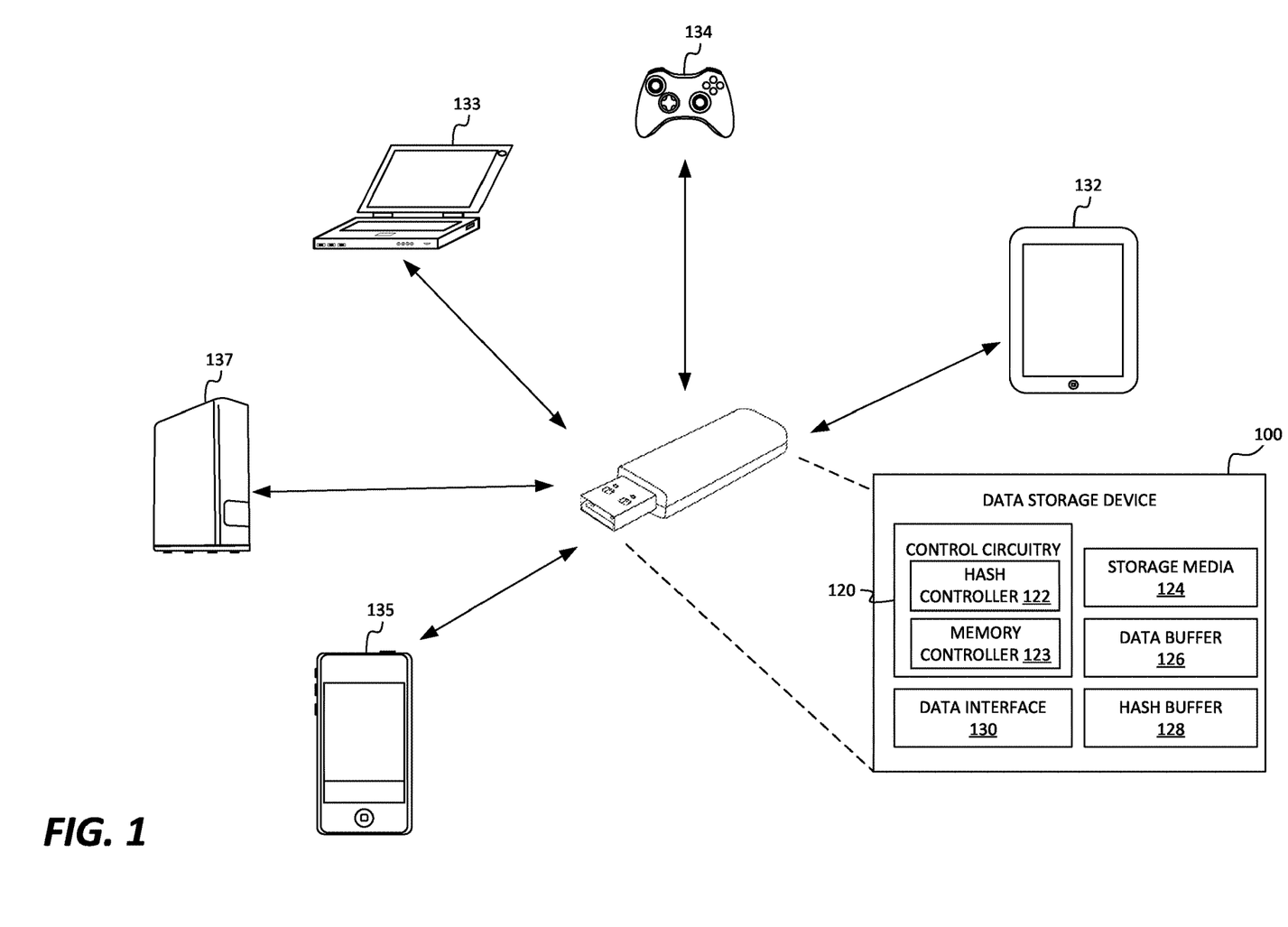
FIG. 1 is a diagram illustrating a data storage device that implements a deduplication process for file transfers from host devices, according to certain embodiments.

FIG. 1 is a diagram illustrating a data storage device 100 that implements a deduplication process for file transfers from host devices, according to certain embodiments. In some embodiments, the data storage device 100 includes control circuitry 120 for controlling the data storage device 100, storage media 124, a data buffer 126, a hash buffer 128, and a data interface 130. The control circuitry 120 can include hardware and/or software for generating file signatures, such as a hash controller 122. In some embodiments, the file signatures are hashes generated by the hash controller 122. However, other types of file signatures may also be used.

The data storage device 100 can employ a variety of storage technologies and/or form factors. For example, the data storage device 100 may be a solid-state drive (SSD), Secure Digital (SD) card, or a universal serial bus (USB) memory stick that uses semiconductor memory as the storage media 124. In other implementations, the data storage device 100 may be a hard disk drive (HDD) that uses magnetic disks as the storage media 124 or a solid-state hybrid drive (SSHD) that uses a combination of semiconductor memory and magnetic disk technology.

The storage media 124 can utilize various types of non-volatile memory (NVM) to permanently store data. NVM is a type of computer memory that can retain stored information even after power is removed. For example, the storage media 124 can include one or more magnetic disks and/or semiconductor memory. The semiconductor memory can include any of various memory technologies, such as NAND memory and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as ReRam, Phase-Change Memory (PCM), and Magnetoresistive Random-Access Memory (MRAM).

The data storage device 100 can include a small amount of volatile memory, such as random-access memory (RAM) to serve as a cache for data. Such a cache can enable very fast access to data stored on it. In some embodiments, the data buffer 126 and/or the hash buffer 128 are stored in this cache.

In some embodiments, the control circuitry 120 is configured to manage semiconductor memory or magnetic technology. For example, the control circuitry 120 may include a memory or storage controller 123. In some embodiments, the control circuitry 120 is configured to manage the data interface 130. For example, the control circuitry 120 may include a USB controller. The control circuitry 120 can include an embedded processor, electrically erasable firmware read-only-memory (ROM), RAM, error correction code (ECC) circuitry, head controller, voice coil motor (VCM) controller, and/or a host electrical interface such as Serial ATA (SATA), USB, or Serial-Attached SCSI (SAS). While the above has described wired data interfaces, some implementations may be configured to use a wireless data interface such as Wi-Fi, Bluetooth and the like for performing data transfers to the host device.

The control circuitry 120 can also include additional functionality. For example, the control circuitry 120 may support file-based storage. The control circuitry 120 can also include functionally for managing data transfers of the data storage device, such as the hash controller 122. In some embodiments, the hash controller 122 is implemented in firmware, which may be run by a controller chip. In some implementations, the hash controller may be a specialized, hardware-based chip for calculating hashes.

The data interface 130 can include connectors, cables, and/or protocols for connection, communication, and/or power supply between host devices and the data storage device 100. In some embodiments, the data interface 130 comprises USB hardware and software. Various versions of USB can be used, such as USB 2.x, USB 3.x, or USB 4.x. Various types of USB ports can be included on the data storage device, such as male or female Type A, Type B, Type C, mini, and/or micro connectors. Other data interface standards can also be used, such as external SATA (eSATA), ExpressCard, FireWire (IEEE 1394), and Thunderbolt.

In some embodiments, the data storage device 100 lacks its own independent power source, such as a battery or a power supply unit. The data storage device 100 may not have a power connection for alternating current (AC) power, such as an AC power plug that can connect to mains electric power in a building. Instead, the data storage device 100 receives power via the data interface 130. For example, the data storage device 100 may connect via USB to the host system, which typically provides 5 volts of direct current (DC) power, though fast charging ports may provide higher voltages of DC power. A USB interface can provide both power and a conduit for data transmission.

Various types of host devices can connect to the data storage device 100 described herein. Such host devices can include phones 135, such as smartphones, cable set-top boxes (not shown), smart televisions (TV's) (not shown), video game devices 134, laptop computers 133, tablet computers 132, desktop computers (not shown), wearable computers (not shown) and/or other consumer electronic devices 137.

The data storage device 100 may be communicatively coupled to one or more client devices via the data interface 130. The data storage device 100 may provide additional data storage to connected devices or fascinate transfer of data to other host devices. The data storage device 100 may be connected to a physical connection port (e.g., USB) on the host device, either directly (e.g., male port to female port) or via a cable.

Data Transfer Process

Figure 2:
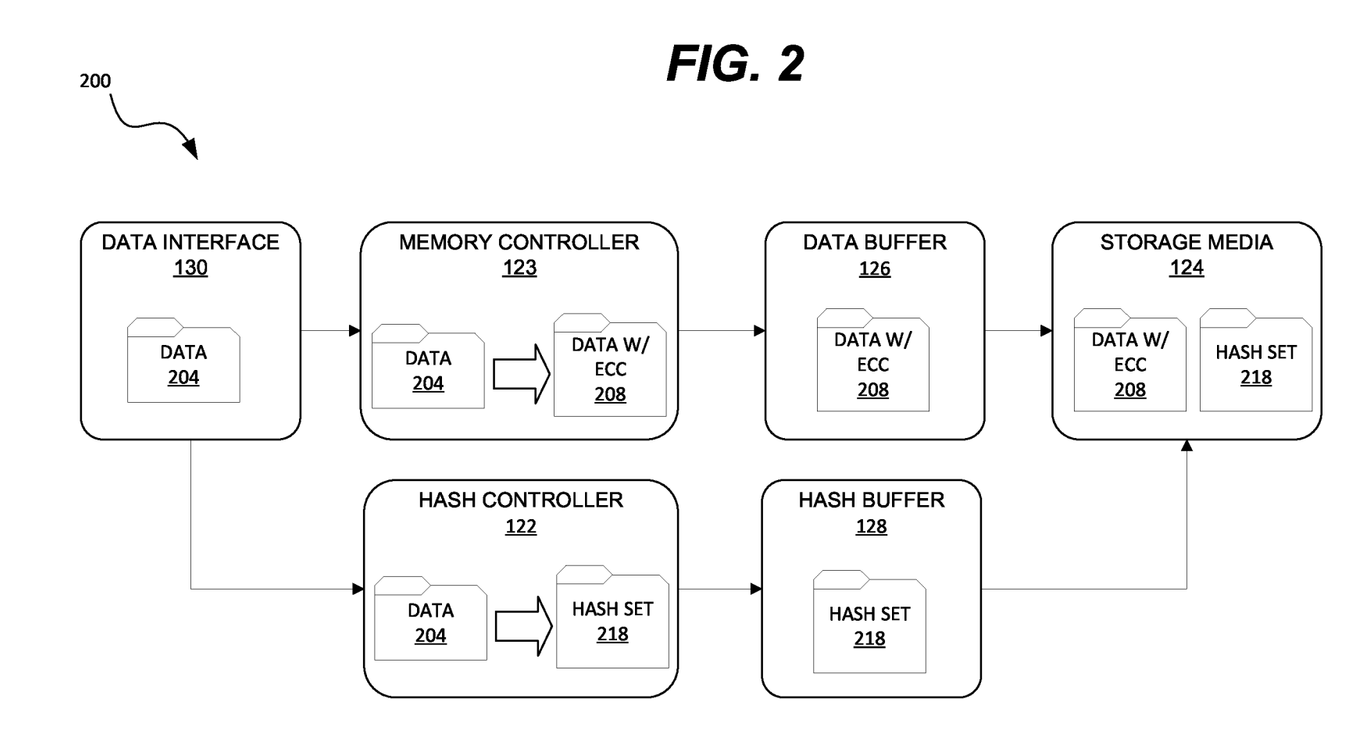
FIG. 2 illustrates a block diagram representing a data transfer process for a data storage device, according to certain embodiments.

FIG. 2 illustrates a block diagram representing a data transfer process 200 for the data storage device 100, according to certain embodiments. In particular, the various blocks represent the location of data in the data storage device 100 during the data transfer process.

In one scenario, a host device (not shown) is connected to the data storage device 100. For example, the data storage device 100 may be a USB memory stick electrically and physically coupled to a USB port of the host device. The data interface 130 enables data to be transmitted from the host device to the data storage device 100 and vice versa. It may also provide power to the data storage device 100. A user may then initiate a data transfer from the host device. Data 204 is then received via the data interface 130 of the data storage device 100. The data 204 can include one or more data files.

The memory controller 123 can then process the data 204 from the data interface 130. The memory controller 123 can then perform various operations in preparation of storing the data 204 on the storage media 124 of the data storage device 100. For example, the memory controller 123 may calculate error correction codes (ECC) for data. The data with its associated ECC 208 can then be saved to the data buffer 126. Typically, the data buffer 126 is faster memory than the storage media 124, so can provide temporary storage for the data w/ ECC 208 until the storage media 124 is ready to permanently store the data w/ ECC.

Meanwhile, the hash controller 122 can process the data 204 to generate the corresponding hash set 218 for that data 204. The hash set 218 can then be stored in the hash buffer 128. Additional hash sets can be generated for additional data received by the data storage device. While space is available, these hash sets can be stored in the hash buffer 128. The hash buffer 128 is typically faster memory than the storage media 124. Thus, retaining the hashes in the hash buffer 128 enables hash comparisons to be processed faster. However, as the hash buffer 128 size is limited, at some point, excess hash sets may be stored in the storage media 124. Any of various caching algorithms known in the art (e.g., first-in first out (FIFO), last-in first out (LIFO), least recently used (LRU), and/or the like). can be used to determine which hash sets to move from the hash buffer 128 to the storage media 124. Optionally, the contents (e.g., hash set 218) of the hash buffer 128 may be backed up to the storage media 124 to protect against power loss. As the hash buffer 128 typically comprise fast, volatile memory, backing up the contents preserves the data in case the data storage device 100 loses power and the data stored in the hash buffer 128 is erased.

File Deduplication Process

Figure 3A:
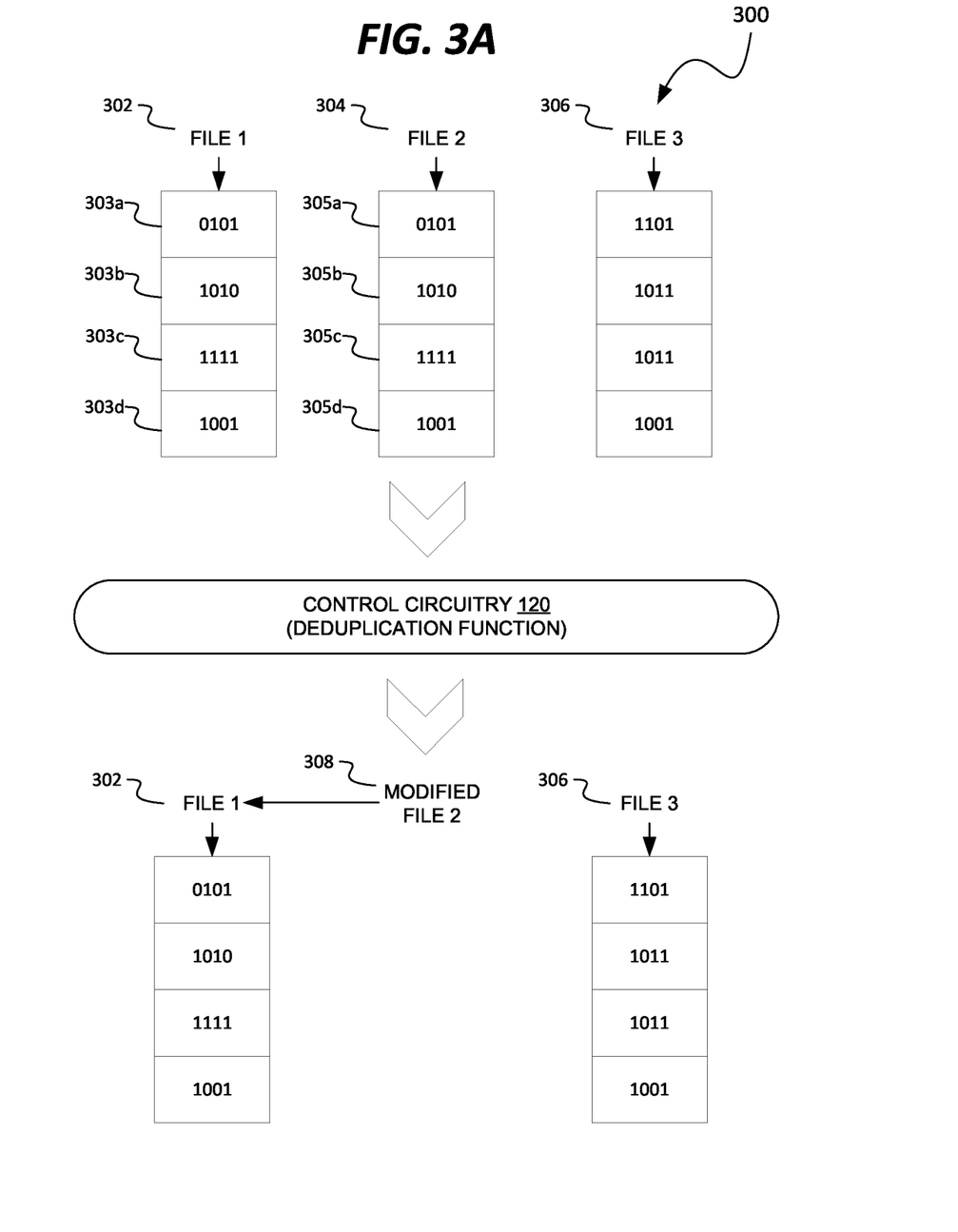
FIG. 3A illustrates a block diagram representing a file deduplication process, according to certain embodiments.

FIG. 3A illustrates a block diagram representing a file deduplication process 300, according to certain embodiments. For ease of reference, the following discusses the deduplication process in reference to the data transfer process 200 of FIG. 2, though is not limited to working just with that process.

When File 1 302 is received by the data storage device 100, the control circuitry 120, as part of its deduplication function, can create a signature, such as a hash set for the file. For example, the control circuitry 120 can divide File 1 into several chunks: 303a, 303b, 303c, and 303d. A hash can be generated for each chunk to generate a hash set that represents File 1, as discussed further in FIG. 3B. Assuming File 1 is not a duplicate of an existing file, the control circuitry 120 can save File 1 to the storage media 124 of the data storage device.

When File 2 304 is received by the data storage device 100, the control circuitry 120 can generate a hash set for the chunks 305a, 305b, 305c, and 305d. As the chunks of File 2 have the same data as the chunks in File 1 302, the hashes will be the same. One property of a good hash function is that the same input generates the same hash. After determining that the hash sets for File 1 are the same as those of File 2, the control circuitry 120 can identify File 2 as identical to File 1.

As File 2 is identical to File 1, the control circuitry 120 can save space in the storage media 124 by not saving File 2, at least not in its current form. Instead, the control circuitry 120 can modify File 2 308 to create a pointer to File 1 302. Various operating systems may handle file pointers in different ways, depending on the implementation of their file system. In one example, modified File 2 may be symbolic link that refers to File 1. When a user tries to access modified File 2 308, the user is directed to the contents of File 1 302.

When File 3 306 is received by the data storage device 100, the control circuitry 120 can generate a hash set for the file. However, as File 3 is not a duplicate of File 1 302 and File 2 304, the hash set would not match the saved hash set from File 1. The control circuitry 120 can then save File 3 unchanged to the storage media 124.

Figure 3B:
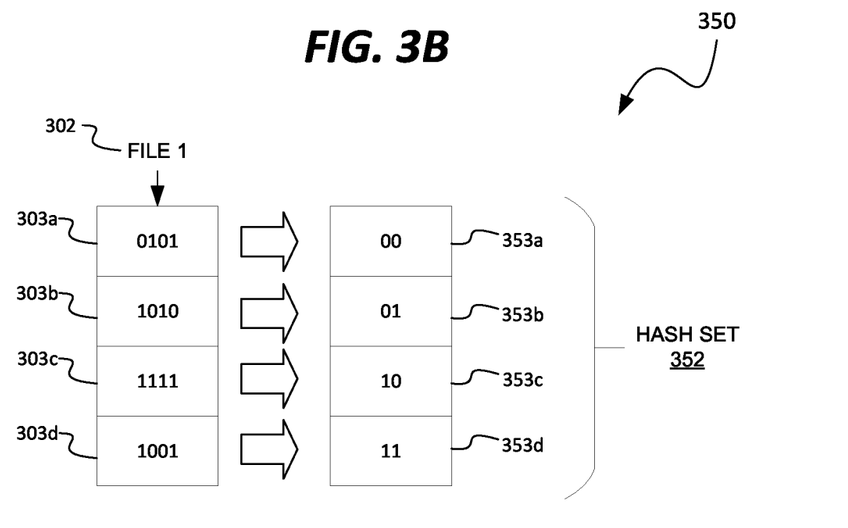
FIG. 3B illustrates a block diagram representing a hash generation process, according to certain embodiments

FIG. 3B illustrates a block diagram representing a hash generation process 350, according to certain embodiments. As discussed in FIG. 3A, the control circuitry 120 can generate a hash for each chunk of File 1 302. For example, hash 353a can be generated from chunk 303a, hash 353b can be generated from chunk 303b, hash 353c can be generated from chunk 303c, and hash 353c can be generated from chunk 303c.

In the illustrated example, chunk 303a is represented by bits 0101 which generates a hash of 00. The other chunks have different bits and happen to generate different hash bits in the provided example. However, as a larger bit space (4 bits) is being mapped to a smaller bit space (2 bits), there may be collisions in some instances where different chunks generate the same hash. However, as each file is split into multiple chunks, the odds that the generated hash set 352 would be identical for a file different from File 1 302 would be very low.

As will be apparent, the above process can work with any arbitrary bit size of chunks for the file and for any arbitrary bit size for the hashes. In one example implementation, 128 kilobyte (KB) chunks are used with 20-byte hashes. However, different sizes can be used for both chunks and/or hashes.

Figure 4A:
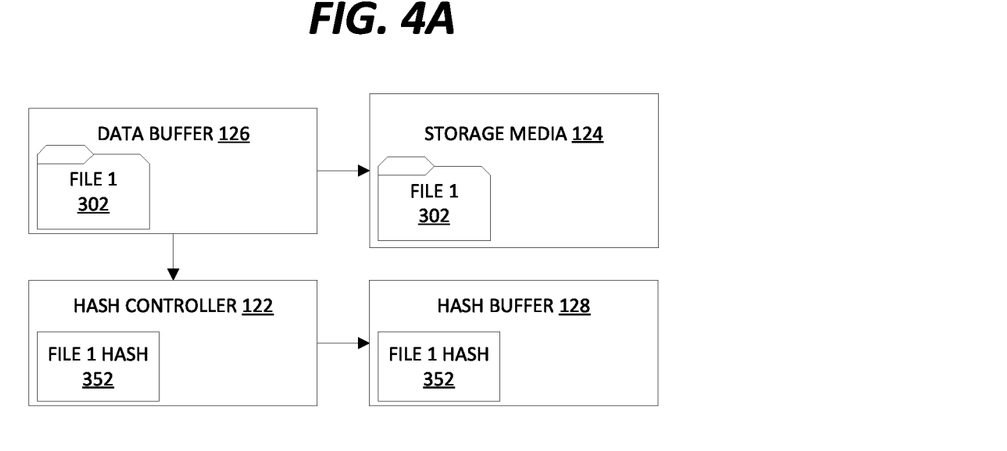
FIGS. 4A-4C illustrate block diagrams representing the location of data during the file deduplication process of FIG. 3A, according to certain embodiments.
Figure 4B:
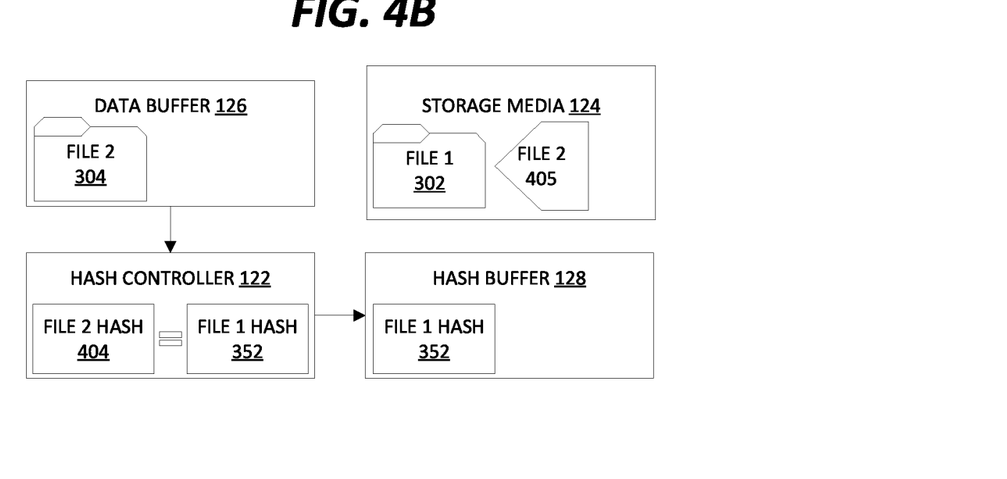
Figure 4C:
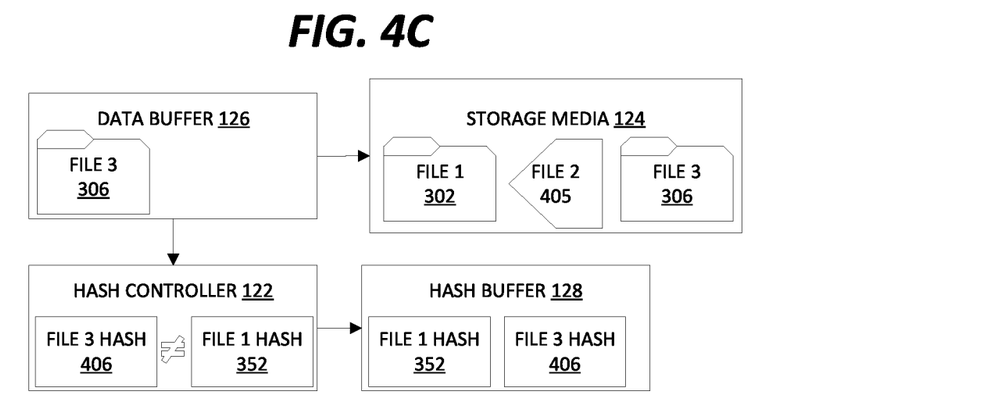

FIGS. 4A-4C illustrate block diagrams representing the location of data during the file deduplication process 300 of FIG. 3A, according to certain embodiments. FIG. 4A illustrates the propagation of File 1 302 to the various components of the data storage device 100. File 1 is received from the host, via the data interface, and then stored in the data buffer 126. File 1 is than permanently stored in the storage media 124. Metadata for File 1 may be generated during the process, such as error codes.

Meanwhile, the hash controller 122 processes File 1 302 from the data buffer 126 to generate a File 1 hash(es) 352. In some embodiments, File 1 is divided into multiple chunks and hashes for each of the chunks are calculated. Assuming there are no other hashes for comparison as File 1 is the first file being processed, the hash set (one or more hashes) for File 1 is then saved. The hash controller 122 may save the File 1 hash 352 in the hash buffer 128. At a later time, the contents of the hash buffer 128 may be saved to the storage media 124. For example, sufficient files may be processed that there is not enough room on the hash buffer 128 for the corresponding hashes. Various caching algorithms (e.g., LIFO, FIFO, LRU, etc.) can be used to determine which hashes to remove from the hash buffer 128 and save to the storage media 124.

FIG. 4B illustrates the propagation of File 2 304 to the various components of the data storage device 100. File 2 is received from the host, via the data interface, and then stored in the data buffer 126. The hash controller 122 processes File 1 302 from the data buffer 126 to generate a File 2 hash(es) 404. In some embodiments, File 2 is divided into multiple chunks and hashes for each of the chunks are calculated. The hash set (one or more hashes) for File 2 is then compared to previously generated hashes for other files. In this scenario, the File 2 hash 404 is compared to the File 1 hash 352 that is retained in the hash buffer 128.

In the scenario where File 1 302 and File 2 304 are identical files, the hash controller 122 generates identical hashes from the two files. Upon determining that the File 2 hash 404 is the same as the File 1 hash 352, the hash controller 122 determines that File 1 and File 2 are the same file. The data in File 2 is then discarded, with a symbolic link or other pointer to File 1 saved in the storage media 124. In some embodiments, a user viewing the file system can see the original File 1 302 and a modified File 2 405, where the modified File 2 405 does not contain the original data from File 2 304, but instead points to the data held in File 1 302.

FIG. 4C illustrates the propagation of File 3 306 to the various components of the data storage device 100. File 3 is received from the host, via the data interface, and then stored in the data buffer 126. The hash controller 122 processes File 3 306 from the data buffer 126 to generate a File 3 hash(es) 406. In some embodiments, File 3 is divided into multiple chunks and hashes for each of the chunks are calculated. The hash set (one or more hashes) for File 3 is then compared to previously generated hashes for other files. In this scenario, the File 3 hash 406 is compared to the File 1 hash 352 that was retained in the hash buffer 128.

In the scenario where File 1 302 and File 3 306 are different files, the hash controller 122 should generate different hashes from the two files. Upon determining that the File 3 hash 406 is different from the File 1 hash 352, the hash controller 122 determines that File 1 and File 2 are different files. If there are previously calculated hashes for other files, the hash controller 122 proceeds with comparing the File 3 hash with each of the remaining hashes. Assuming there are no matches, the hash controller 122 determines that File 3 306 is not a duplicate of an existing file stored in the storage media 124. File 3 306 is then saved in the storage media 124 while the File 3 hash 306 is saved to the hash buffer 128 for comparison with other files processed in the future.

Optionally, if the hash buffer 128 becomes full, some of the hashes may be flushed to the storage media 124. In some embodiments, the hash controller 122 may retrieve the stored hash data from the storage media 124 to compare a current hash with previously stored hashes (also referred to as "full hash comparison"). However, as the storage media 124 is typically slower than the hash buffer 128, retrieving the data may slow down data transfers. Alternatively, in some embodiments, the hash comparisons are done only with hashes in the hash buffer 128, to avoid accessing the slower storage media 124 (also referred to as "buffered hash comparison").

While this alternative may result in less matches found and therefore less space savings, that may be a reasonable tradeoff for reducing loss of performance so that users do not readily notice delays in performing file transfers. In addition, the chances of a cache miss can be ameliorated by picking an appropriate caching algorithm to increase the chances that the most used hashes are kept in the hash buffer 128. For example, the hashes may be associated with a hit counter that counts the number of times that there is a hit with that hash set. Under the assumption that a file that is duplicated is more likely to have additional duplicates (e.g., it is an important file that is backed up often), then hash sets with cache hits are prioritized for retention in the hash buffer 128. In this example, hash sets with no hits would be replaced from the hash buffer 128 first, with other additional criteria used for ties, such as getting rid of older hash sets first.

Figure 5:
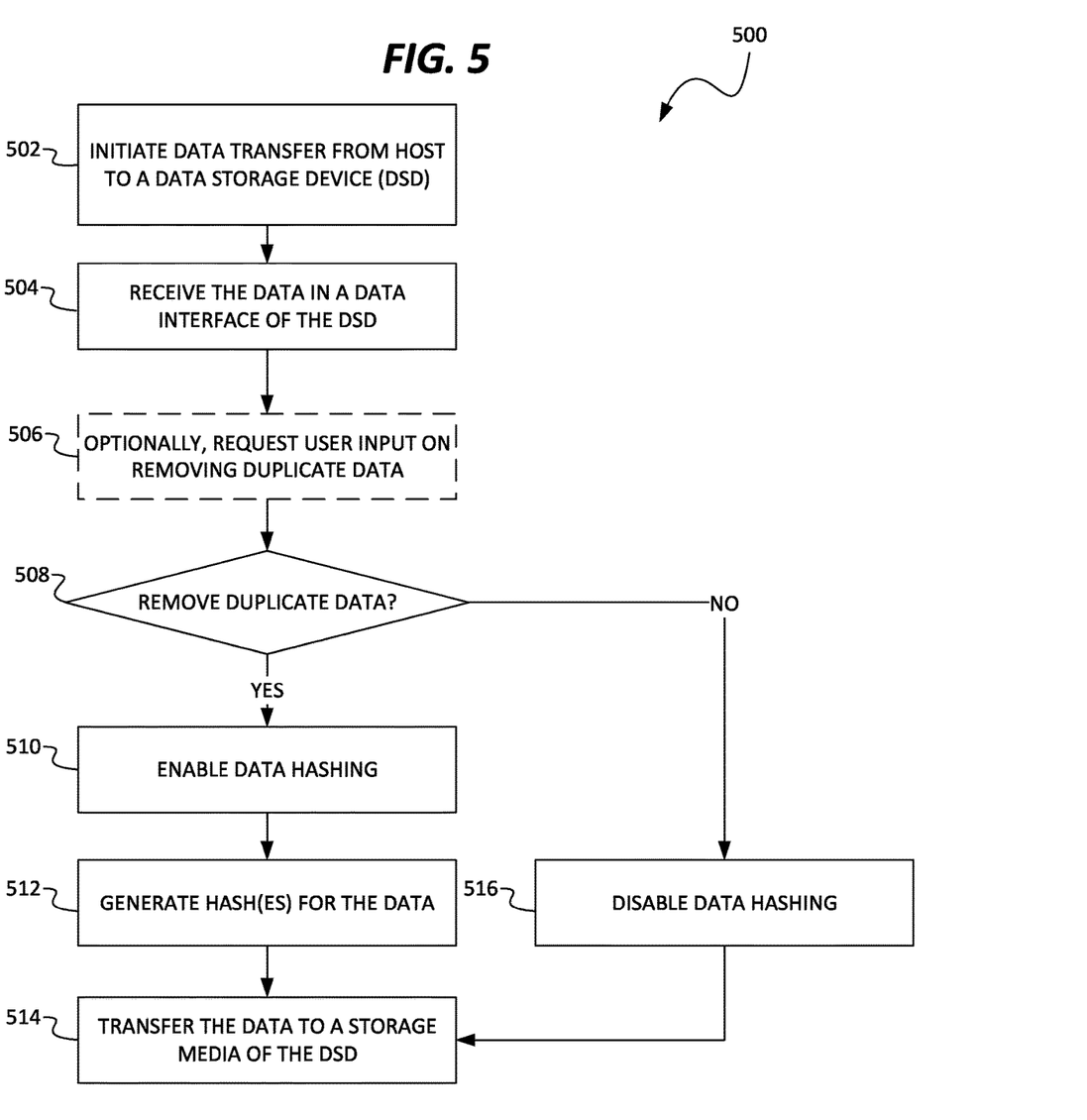
FIG. 5 illustrates a process for enabling a deduplication function in the data storage device.

FIG. 5 illustrates a process 500 for enabling a deduplication function in a data storage device (DSD) 100, according to certain embodiments. At least some of the steps of the process 500 may be implemented by a data storage device 100 or its components, such as its control circuitry 120. For ease of explanation, the following refers to components described in earlier figures. However, the process 500 is not limited to being performed just by those components and other embodiments may use different components to run the process.

At block 502, a user can initiate a data transfer from a host system to the data storage device 100. For example, the user may connect a USB memory stick to a USB port on the host system. The user can then access the USB memory stick via a file manager of an operating system of the host system. The user can then select files for copying to the USB memory stick (or other type of data storage device 100).

At block 504, the data storage device 100 receives the data on a data interface 130, such as a USB bridge and port. The data may then be stored on a data buffer 126 of the data storage device 100.

At block 506, the data storage device 100 may optionally request a user input on whether to enable removing duplicate data. For example, the data storage device 100 may utilize a specialized driver or utility that is installed on the host system. The driver or utility may then display a screen or window on a display of the host system asking the user whether to enable or disable the removal of duplicate data. Other options may also be presented to the user, such as whether to prioritize space savings or performance. In one example, depending on the selected priority, the data storage device 100 may enable "full hash comparison" (prioritizing space savings) or, alternatively, "buffered hash comparison" (prioritizing performance), as described earlier above.

The data storage device 100 may also have a default setting of either turning on or off deduplication that is set by the device manufacturer. If no user input is received or requested, the default settings are kept for the deduplication process.

At block 508, the data storage device 100 determines whether to remove the duplicate data based on the selected (or default) setting. If the data deduplication setting is selected, the process proceeds to block 510. If the data deduplication setting is not selected, the process proceeds to block 516.

At block 510, the data storage device 100 enables data hashing. With data hashing enabled, the data storage device 100 generates hashes for comparison of files received during the data transfer. These hashes enable the data storage device 100 to identify duplicate files using fast comparisons. However, these comparisons add some overhead to the file transfer process. As hash generation and hash comparisons are fast, this overhead may not be noticeable to a user.

While file comparisons could be performed using the full files, these file comparisons would be much slower. For one, comparing the entire file rather than a much smaller hash would take longer. For another, as the files are larger, only a few files could be kept in a buffer, with most files stored in the storage media 124. Accessing these files on the storage media 124 would be quite slow, as the storage media 124 is typically much slower than buffer storage, which typically uses fast cache or fast volatile memory.

At block 512, the data storage device 100 generates hash(es) for the data. While it is possible to use a single hash per file, as discussed above, dividing a file into sections and generating a hash for each section can better identify duplicate files. In one implementation, the data storage device 100 generates a hash set comprising one or more hashes for each of the files in the data.

At block 514, the data storage device 100 transfers the data to the storage media 124. The data may have been stored in the data buffer 126 while the data storage device 100 determines that the data does not have duplicate files. If no duplicate files are found, the data can be transferred to the storage media 124 unchanged. However, if duplicate files are found, the data storage device 100 can modify the data to remove the duplicate (e.g., by using pointers or symbolic links).

Meanwhile, going back to block 508, if data deduplication is not selected, the process proceeds to block 516. At block 516, the data storage device 100 can disable hashing based on the user input received. The data storage device 100 can then proceed to block 514, where the data is transferred to the storage media 124 unchanged.

Figure 6:
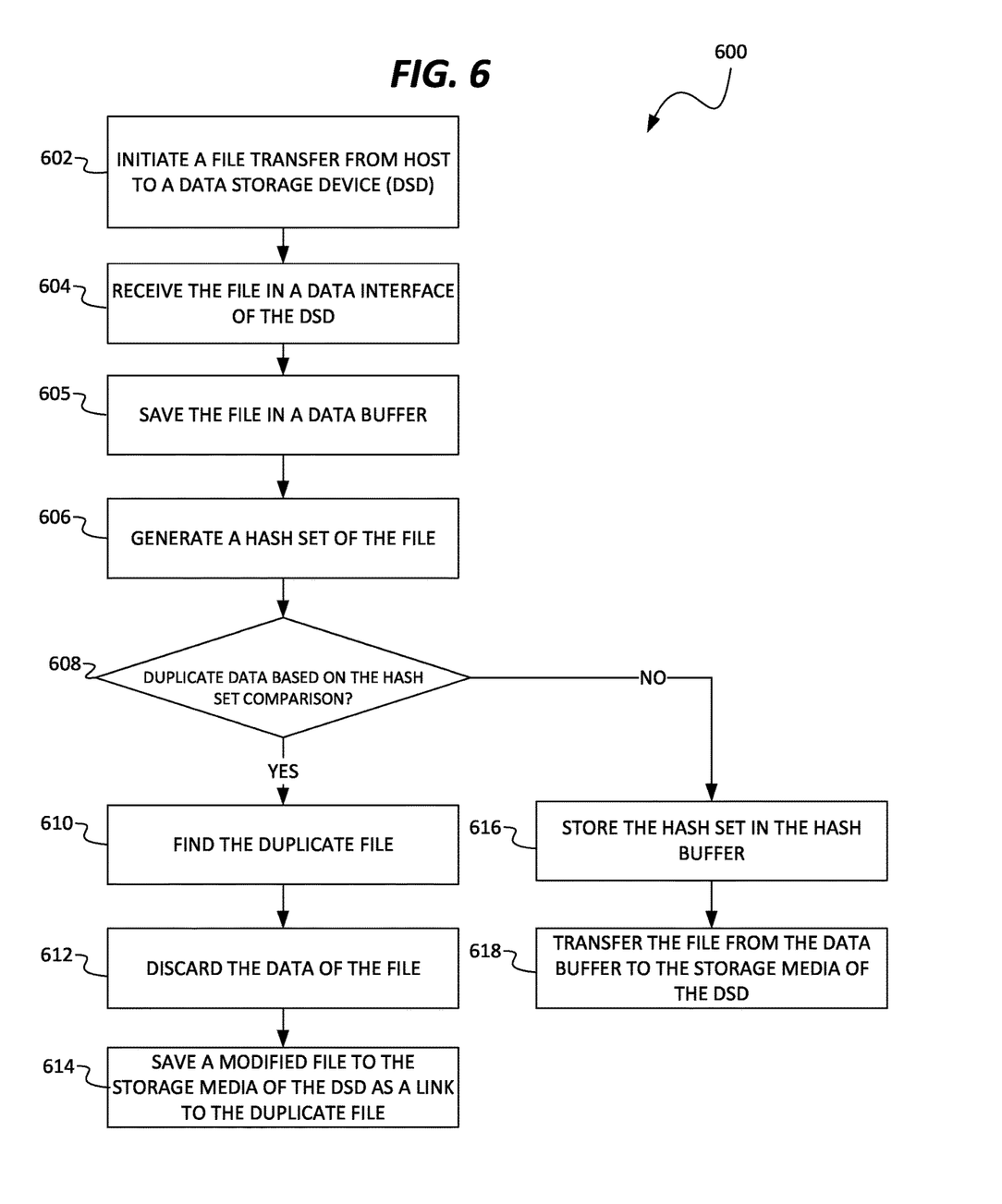
FIG. 6 illustrates a process for performing deduplication during a file transfer to the data storage device, according to certain embodiments.

FIG. 6 illustrates a process 600 for performing deduplication during a file transfer to the data storage device 100, according to certain embodiments. At least some of the steps of the process 600 may be implemented by a data storage device 100 or its components, such as its control circuitry 120. For ease of explanation, the following refers to components described in earlier figures. However, the process 600 is not limited to being performed just by those components and other embodiments may use different components to run the process.

At block 602, a user can initiate a data transfer from a host system to the data storage device 100. For example, the user may connect a USB memory stick to a USB port on the host system. The user can then access the USB memory stick via a file manager of an operating system of the host system. The user can then select files for copying to the USB memory stick (or other type of data storage device 100).

At block 604, the data storage device 100 receives the data on a data interface 130, such as a USB bridge and port. The data may then be stored on a data buffer 126 of the data storage device 100.

At block 605, the control circuitry 120 saves the file in a data buffer 126. Typically, the data buffer 126 comprises fast memory, such as cache or RAM, that enables data to be written and/or read quickly, especially relative to the storage media 124.

At block 606, the control circuitry 120 generates a hash set corresponding to the file, such as via the process described in FIG. 3B. The hash set can include one hash or multiple hashes. For example, if the file is small (e.g., less than 128 kilobytes), only one hash may be generated. If the file is larger, the file can be divided into smaller chunks (e.g., 128 kilobytes or less) and a hash can be generated for each chunk. The hashes for the file can be collectively stored as a hash set.

At block 608, the control circuitry 120 performs a hash comparison of the generated hash set for the file with previously stored hashes (also referred to as "stored hash sets") corresponding to other files that have been transferred to the data storage device 100. If a match is found, the process 600 proceeds to block 610. If no match is found, the process 600 proceeds to block 616.

In some embodiments, the stored hash sets used for the comparison comprises only those hash sets that are stored in the hash buffer 128. In some implementations, the manufacturer may want to minimize delays introduced to data transfers by the deduplication process. By avoiding using the storage media 124, which is typically slower, for writing hash sets to or reading hash sets from, better performance can be obtained. While this may lead to not all duplicate files being found during the data transfer, this loss of space savings may be worth it for the gain in the performance speed of the duplication process.

In other embodiments, the stored hash sets used for the comparisons comprises hash sets that are stored in the hash buffer 128 and on the storage media 124. By using the storage media 124, there can be enough space to store a complete set of hash sets for all the files stored in the storage media 124. That means, a new file can be checked against all other files on the storage media 124 for duplicates, thereby enabling the control circuitry 120 to find all duplicates.

In yet another embodiment, the storage hash sets used for the comparison comprises hash sets that are generated only during the file transfer or a single session. In some implementations, the hash buffer 128 may be very small, enabling only a limited number of hashes to be stored on it. Thus, hashes may be stored only on a per transfer or per session basis, where duplicate files are found during the same transfer or during the same session where the data storage device 100 is connected and powered by the host system. In this embodiment, the hashes are stored in the hash buffer while the data storage device 100 is powered, but is discarded once the device is disconnected. For example, assuming the hash buffer 128 is volatile memory, the hashes stored on the hash buffer are allowed to clear when power to hash buffer 128 is lost (e.g., a USB memory stick is removed from a USB port).

Assuming a match is found when comparing the generated hash set with the stored hash sets, the process 600 proceeds to block 610. At block 610, the control circuitry 120 determines that a duplicate file exists and finds the location of the duplicate file, which may be on the data buffer and/or the storage medium.

At block 612, the control circuitry 120 discards the contents or data stored in the file. As the contents are duplicated, the file can be modified to refer to the duplicate file already stored in the data storage device 100. In one implementation, discarding the data involves leaving the file in the data buffer 126 without writing the file for permanent storage to the storage media 124. As new files are written to the data buffer 126, the data for the discarded file is overwritten and erased.

At block 614, the control circuitry 120 saves the modified file to the storage media 124 as a link to the duplicate file. For example, the file may be saved as a symbolic link to the duplicate file. Depending on the file system used by the data storage device 100, other link formats may be used. The process 600 may then end.

Going back to block 608, assuming a match is not found when comparing the generated hash set with the stored hash sets, the process 600 proceeds to block 616. At block 616, the control circuitry 120 stores the hash set for the file in the hash buffer 128. As there is no match, the file is not a duplicate of an existing file and a signature for the file should be stored in the hash buffer 128 to find duplicates of the current file that are received in the future.

At block 618, the control circuitry 120 transfers the file from the data buffer 126 to the storage media 124. As the file is not a duplicate, the file can be stored in the storage media 124 without being modified. The process 600 may then end.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
a data interface configured to connect to a host device;
a data buffer;
a hash buffer;
non-volatile storage media;
control circuitry configured to:
determine that the data storage device is connected and receiving power from the host device, wherein the data storage device lacks a battery;
initiate a data transfer operation to transfer data from the host device to the data storage device based on the determination that the data storage device is connected and receiving power from the host device;
receive a plurality of data files from the host device at the data interface;
perform a deduplication operation during the data transfer operation, wherein the deduplication operation comprises:
transferring a first file of the plurality of data files to the data buffer;
generating a first hash set and storing the first hash set in the hash buffer, wherein the first hash set corresponds to the first file;
determining whether to perform a full hash comparison or a buffered hash comparison based on a tradeoff of reduced performance, wherein:
the full hash comparison comprises comparing the first hash set to one or more hash sets stored in the non-volatile storage media; and
the buffered hash comparison comprises comparing the first hash set to one or more hash sets stored in the hash buffer;
comparing the first hash set using the full hash comparison to determine whether the first hash set matches one or more hash sets in the non-volatile storage media;
comparing the first hash set using the buffered hash comparison to determine whether the first hash set matches one or more hash sets in the hash buffer;
discarding data of the first file stored in the data buffer and replacing the data of the first file with a pointer to data associated with the one or more hash sets that match the first hash set;
track a number of times that a hash set stored in the non-volatile storage media or hash buffer matches the first hash set, wherein the tracking comprises increasing a hit counter associated with the first hash set; and
rank the first file in the data buffer based on the hit counter.

2. The data storage device of claim 1, further comprising volatile memory configured to store the data buffer and the hash buffer.

3. The data storage device of claim 2, wherein a copy of contents of the hash buffer are stored in the non-volatile storage media.

4. The data storage device of claim 3, the control circuitry is further configured to:
in response to a power loss of the data storage device, restore the hash buffer in the volatile memory from the copy of the contents of the hash buffer stored in the non-volatile storage media.

5. The data storage device of claim 1, wherein a first total size of the received plurality of data files is greater than a second total size of the plurality of data files as stored in the data storage device.

6. The data storage device of claim 1, wherein at least one hash is calculated for each file of the plurality of data files.

7. The data storage device of claim 1, wherein the control circuitry is further configured to:
divide the first file into a plurality of chunks; and
generate a hash for each of the plurality of chunks of the first file, wherein the first hash set comprises generated hashes for the plurality of chunks.

8. The data storage device of claim 1, wherein the first hash set is a single hash.

9. The data storage device of claim 1, wherein the pointer to the first file comprises a symbolic link.

10. The data storage device of claim 1, wherein the file with the highest rank is prioritized for retention in the data buffer, wherein the file with the highest rank is the file with the highest hit counter.

11. A method for deduplicating files during a data transfer to a data storage device, the method comprising:
receiving a plurality of data files from a host device at a data interface of the data storage device;
transferring a first file of the plurality of data files to a data buffer of the data storage device;
generating a first hash set and storing the first hash set in a hash buffer of the data storage device, wherein the first hash set corresponds to the first file;
determining whether to perform a full hash comparison or a buffered hash comparison based on a tradeoff of reduced performance, wherein:
the full hash comparison comprises comparing the first hash set to one or more hash sets stored in non-volatile memory of the data storage device; and
the buffered hash comparison comprises comparing the first hash set to one or more hash sets stored in the hash buffer;
comparing the first hash set using the full hash comparison to determine whether the first hash set matches one or more hash sets in a non-volatile storage media;
comparing the first hash set using the buffered hash comparison to determine whether the first hash set matches one or more hash sets in the hash buffer;
discarding data of the first file stored in the data buffer and replacing the data of the first file with a pointer to data associated with the one or more hash sets that match the first hash set;
track a number of times that a hash set stored in the non-volatile memory or the hash buffer matches the first hash set, wherein the tracking comprises increasing a hit counter associated with the first hash set; and
rank the first file in the data buffer based on the hit counter, wherein the method occurs during a data transfer from the host device to the data storage device while the data storage device is connected and receiving power from the host device.

12. The method of claim 11, wherein the data buffer and the hash buffer are stored in volatile memory of the data storage device.

13. The method of claim 12, further comprising:
copying at least some contents of the hash buffer to the non-volatile memory.

14. The method of claim 13, further comprising:
in response to a power loss of the data storage device, restoring the hash buffer in the volatile memory from the copy of the contents of the hash buffer stored in the non-volatile memory.

15. The method of claim 11, wherein a first total size of the received plurality of data files is greater than a second total size of the plurality of data files as stored in the data storage device.

16. The method of claim 11, wherein at least one hash is calculated for each file of the plurality of data files.

17. The method of claim 11, wherein generating the first hash set comprises:
dividing the first file into a plurality of chunks; and
generating a hash for each of the plurality of chunks of the first file, wherein the first hash set comprises generated hashes for the plurality of chunks.

18. The method of claim 11, wherein the first hash set is a single hash.

19. The method of claim 11, wherein the pointer to the first file comprises a symbolic link.

20. A data storage device comprising:
a data interface configured to connect to a host device;
a data buffer;
a hash buffer;
means for permanently storing data;
means for generating hash sets;
control circuitry configured to:
determine that the data storage device is connected and receiving power from the host device;
initiate a data transfer operation to transfer data from the host device to the data storage device based on the determination that the data storage device is connected and receiving power from the host device;
receive a plurality of data files from the host device at the data interface;
perform a deduplication operation during the data transfer operation, wherein the deduplication operation comprises:
transferring a first file of the plurality of data files to the data buffer;
generating a first hash set and storing the first hash set in the hash buffer, wherein the first hash set corresponds to the first file and is obtained from the means for generating hash sets;
determining whether to perform a full hash comparison or a buffered hash comparison based on a tradeoff of reduced performance, wherein:
the full hash comparison comprises comparing the first hash set to one or more hash sets stored in the means for permanently storing data; and
the buffered hash comparison comprises comparing the first hash set to one or more hash sets stored in the hash buffer;
comparing the first hash set using the full hash comparison to determine whether the first hash set matches one or more hash sets in a non-volatile storage media;
comparing the first hash set using the buffered hash comparison to determine whether the first hash set matches one or more hash sets in the hash buffer;
discarding data of the first file stored in the data buffer and replacing the data of the first file with a pointer to data associated with the one or more hash sets that match the first hash set;
track a number of times that a hash set stored in the means for permanently storing data or hash buffer matches the first hash set, wherein the tracking comprises increasing a hit counter associated with the first hash set; and
rank the first file in the data buffer based on the hit counter.

* * * * *